United States Patent
McCalley et al.

(10) Patent No.: US 11,960,693 B1
(45) Date of Patent: Apr. 16, 2024

(54) RESISTIVE TOUCH SENSOR WITH IMPROVED FORCE UNIFORMITY

(71) Applicant: Rockwell Collins, Inc., Cedar Rapids, IA (US)

(72) Inventors: Cameron T McCalley, Marion, IA (US); Alyssa A. Groth, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/200,799

(22) Filed: May 23, 2023

(51) Int. Cl.
*G06F 3/045* (2006.01)

(52) U.S. Cl.
CPC .... *G06F 3/045* (2013.01); *G06F 2203/04103* (2013.01)

(58) Field of Classification Search
CPC .... G06F 3/0446; G06F 1/1626; G06F 3/0412; G06F 3/04164; G06F 1/1637; G06F 1/1643; G06F 2203/04107; G06F 2203/04103; G06F 3/045
See application file for complete search history.

(56) References Cited

U.S. PATENT DOCUMENTS

| | | | |
|---|---|---|---|
| 1,067,122 A | 7/1913 | Lloyd | |
| 8,488,308 B2 | 7/2013 | Ng et al. | |
| 8,531,418 B2 | 9/2013 | Nolting et al. | |
| 8,638,318 B2 | 1/2014 | Gao et al. | |
| 9,411,457 B2* | 8/2016 | Perlin | G06F 3/04144 |
| 9,710,087 B1* | 7/2017 | Jayaraj | G06F 3/041 |
| 10,409,331 B2* | 9/2019 | Park | G06F 3/0446 |
| 11,561,636 B2* | 1/2023 | Seo | G06F 3/0418 |
| 11,656,698 B1* | 5/2023 | Takahashi | B32B 27/08 |
| | | | 345/173 |
| 2007/0222766 A1 | 9/2007 | Bolender | |
| 2012/0089348 A1* | 4/2012 | Perlin | G06F 3/005 |
| | | | 702/41 |
| 2017/0097661 A1* | 4/2017 | Park | G06F 1/1626 |
| 2019/0384441 A1* | 12/2019 | Seo | G06F 3/0416 |
| 2021/0365131 A1 | 11/2021 | Zhou et al. | |
| 2022/0308729 A1* | 9/2022 | Perlin | G06F 3/047 |

* cited by examiner

*Primary Examiner* — Olga V Merkoulova
(74) *Attorney, Agent, or Firm* — Suiter Swantz pc llo

(57) ABSTRACT

A resistive touch sensor includes a base layer, a sensor top sheet positioned in spaced apart relation to a base layer, and a peripheral edge seal formed between the sensor top sheet and the base layer. The sensor further includes a first adhesive layer bonded on a peripheral edge portion to the sensor top sheet, and a second adhesive layer, inset relative to the peripheral edge seal, positioned between the first adhesive layer and the sensor top sheet. The second adhesive layer is bonded on one side to the first adhesive layer and an opposing side to the sensor top sheet corresponding to a portion of a touch active area. The second adhesive layer causes a planarity change in the sensor top sheet proximate the peripheral edge seal thereby increasing the usable area and improving uniformity of touch force across the sensor.

20 Claims, 5 Drawing Sheets

RESISTIVE TOUCH SENSOR WITH IMPROVED FORCE UNIFORMITY

TECHNICAL FIELD AND BACKGROUND

The present disclosure relates generally to touch sensor technology, and more particularly, to a resistive touch sensor including an inset adhesive layer positioned relative to a peripheral edge seal to preconform the sensor top sheet to increase planarity across the spaced sensor layers.

Current resistive touch sensors have a significant and perceivable increase in touch force required to register a touch near the peripheral edges of the touch sensor. This is inherent to the design of resistive touch sensors including a picture frame bond formed between the sensor top sheet and the base glass that physically constrains the two layers at a greater distance than the compliant spacer posts used to maintain distance throughout most of the sensor.

Attempts to mitigate such touch force uniformity issues include locating icons inward from the edge of the display over which the sensor is bonded, and adjusting the sensitivity of the touch force so that the relative touch force increase is difficult to perceive. These solutions are undesirable in that the former decreases the usable portion of the touch sensor, while the latter complicates the touch sensor and risks designs that are more susceptible to sensor shorting.

Therefore, what is needed is a touch sensor that maximizes the active area of the sensor while improving touch force uniformity across the touch sensor in a robust, reliable, and cost-effective manner.

BRIEF SUMMARY

In one aspect, embodiments of the inventive concepts disclosed herein are directed to a resistive touch sensor. In embodiments, the touch sensor includes a base layer, a sensor top sheet positioned in spaced apart relation above the base layer, and a peripheral edge seal formed between the sensor top sheet and the base layer. The touch sensor further includes a first adhesive layer bonded on a peripheral edge portion of the sensor top sheet, and a second adhesive layer, inset relative to the peripheral edge seal, positioned between the first adhesive layer and the sensor top sheet. The second adhesive layer is bonded on a first side to the first adhesive layer and bonded on a second side to a portion of the sensor top sheet corresponding to a touch active area, wherein the second adhesive layer deforms the sensor top sheet proximate the peripheral edge seal such that the touch active area of the sensor top sheet is positioned closer to the base layer as compared to the peripheral edge portion of the sensor top sheet. In embodiments, the touch sensor further includes a cover layer bonded on the first adhesive layer.

In some embodiments, the second adhesive layer is spaced inward from the peripheral edge seal, along each edge of the second adhesive layer, such that a continuous peripheral gap is formed between the peripheral edge seal and the second adhesive layer.

In some embodiments, the continuous peripheral gap formed between the peripheral edge seal and the second adhesive layer is at least 100 microns wide.

In some embodiments, the thickness of the second adhesive layer is no greater than the thickness of the peripheral edge seal.

In some embodiments, the thickness of the second adhesive layer is less than the thickness of the peripheral edge seal.

In some embodiments, the thickness of the second adhesive layer is between 25 microns and 50 microns.

In some embodiments, the thickness of the first adhesive layer is at least ten times the thickness of the second adhesive layer.

In some embodiments, the thickness of the first adhesive layer is between 400 microns and 600 microns.

In some embodiments, the base layer is glass, the cover layer is glass, and each of the first adhesive layer and the second adhesive layer are optically clear adhesive (OCA) layers.

In some embodiments, the touch sensor is incorporated in a display application including a bezel covering a peripheral edge portion of the cover layer.

According to another aspect, the present disclosure provides a method of manufacturing a resistive touch panel sensor. The method includes, not necessarily in sequential order, providing a first adhesive layer, providing a second adhesive layer dimensioned smaller than the first adhesive layer, and dry bonding the first and second adhesive layers such that the peripheral edges of the second adhesive layer are positioned inward relative to the peripheral edges of the first adhesive layer. The method further includes, not necessarily in sequential order, dry bonding the bonded first and second adhesive layers on a sensor top sheet further bonded in spaced apart relation, via a peripheral edge seal, to a base layer, wherein the first adhesive layer bonds to a peripheral edge portion of the sensor top sheet and the second adhesive layer bonds to a touch active area of the sensor top sheet such that the sensor top sheet is caused to deform proximate the peripheral edge seal to position the touch active area of the sensor top sheet closer to the base layer as compared to the peripheral edge portion of the sensor top sheet. The method continues with, not necessarily in sequential order, bonding a cover layer on the first adhesive layer. In embodiments, the bonding process may be performed in substantially reverse order.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
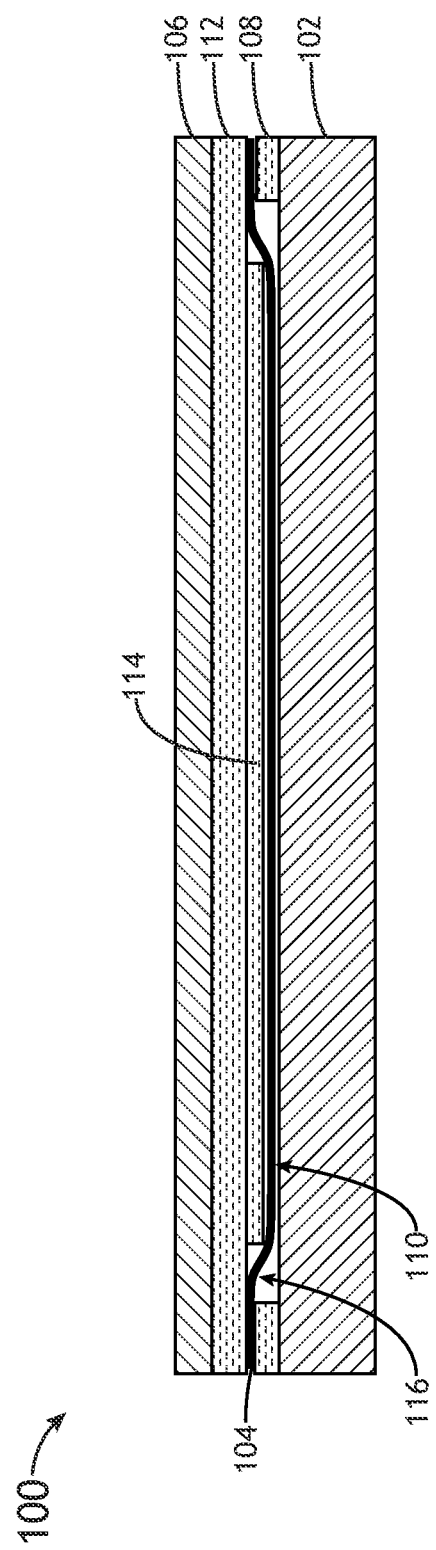
FIG. 1 is a schematic cross-section of a resistive touch sensor, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a resistive touch sensor and method for manufacturing the same. The resistive touch sensor described herein (hereafter the "sensor") includes an additional or secondary inset adhesive layer configured to deform/preconform the sensor top sheet to enhance planarity between the spaced sensor layers closer to the peripheral edges of the sensor. By improving planarity across the entire touch active area of the sensor, a greater portion of the viewing area of an assembly may be made usable for touch action, as well as providing a more uniform touch action for the sensor. In some embodiments, the sensor may be made according to dry bonding manufacturing techniques to form a bonded stack. In embodiments, optically clear adhesive (OCA) in sheet form serves a bonding function, and an additional OCA sheet inset within the sensor serves to deform/preconform the sensor top sheet to enhance planarity between the substrate layer and the sensor top sheet.

FIG. 1 schematically illustrates a resistive touch sensor 100. The sensor 100 generally includes a base layer 102, a sensor top sheet 104 configured to interact with the base layer 102, and a protective cover layer 106. Each of the base layer 102 and the cover layer 106 may be glass layers. The sensor top sheet 104 is positioned in spaced apart relation above the base layer 102, and the two layers are bonded together by a peripheral edge seal 108 forming a sealed chamber 110. Although not shown, compliant posts may be provided between the facing sides of the sensor top sheet 104 and the base layer 102 configured to maintain predetermined spacing between the two layers and resiliency for the sensor top sheet 104. In use, force applied to the cover sheet 106 in a direction perpendicular thereto causes the sensor top sheet 104 to move into contact (e.g., physical or electrical) with the base layer 102 to register a touch action at the location of the applied force.

The sensor top sheet 104 is further bonded on an opposing side thereof to a first adhesive layer 112 and a second adhesive layer 114. In embodiments, each of the first and second adhesive layers 112, 114 may be optically clear adhesive (OCA) layers implemented as pressure sensitive adhesive sheets configured for dry bonding. The second adhesive layer 114 is bonded to the side of the first adhesive layer 112 oriented facing the sensor top sheet 104. As discussed further below, the second adhesive layer 114 is dimensioned smaller than the first adhesive layer 112 such that the second adhesive layer is positioned "inset," e.g., inward, relative to the peripheral edge seal 108. In this configuration, a peripheral edge portion of the sensor top sheet 104 is bonded to the first adhesive layer 112 and an interior portion of the sensor top sheet 104 is bonded to the second adhesive layer 114. In embodiments, the peripheral edge portion of the sensor top sheet 104 corresponds to a touch inactive portion of the sensor top sheet 104, and the interior portion of the sensor top sheet 104 inward of the peripheral seal 108 corresponds to a touch active portion of the sensor top sheet 104.

In some embodiments, the first and second adhesive layers 112, 114 may be integrally formed. As bonded or otherwise integrally formed, the first and second adhesive layers 112, 114 are inverse "stair-stepped" such that the second adhesive layer 114 is positioned below the first adhesive layer 112 and inward of the lateral sides of the first adhesive layer 112. This adhesive layer configuration, when bonded to the sensor top sheet 104 and considering the peripheral edge seal 108, causes the sensor top sheet 104 to deform. As used herein, the "deform" may mean alter, preconform, or otherwise change the original planar shape of the sensor top sheet 104.

By preconforming the sensor top sheet 104, the touch active portion thereof near the edges is moved closed to the base layer 102, and in particular, the sections of the sensor top sheet 104 proximate the peripheral edge seal 108 are made more planar with the underlying base layer 102. The resulting effects are that the two active layers are made more planar across the viewing area of the sensor 100, making more of the viewable area operative for a touch active area, and making the required force action across the viewing area more uniform, e.g., less touch force required immediately adjacent the peripheral edge seal 108.

In embodiments, the height of the peripheral seal 108, measured from the surface of the base layer 102 to the facing surface of the sensor top sheet 104, is greater than the height of the second adhesive layer 114, measured from the sensor top sheet 104 to the facing side of the first adhesive layer 112. As such, spacing between the touch active portion of the sensor top sheet 104 and the base layer 102 is maintained. As shown, the second adhesive layer 114 is spaced inward from the peripheral edge seal 108 such that a continuous peripheral gap 116 is formed between the peripheral edge seal 108 and the second adhesive layer 114. The continuous peripheral gap 116 allows a gradual, i.e., not abrupt, transition to the shape of the of the sensor top sheet 104 between the constrained peripheral edge portion and the bonded touch action portion.

In some embodiments, the width of the continuous peripheral gap, measured between the peripheral edge seal 108 and the second adhesive layer 114, is at least 100 microns wide to facilitate the gradual transition. In some embodiments, the thickness of the second adhesive layer 114 is no greater than the thickness of the peripheral edge seal 108, and preferably less than the thickness of the peripheral edge seal 108. In some embodiments, the thickness of the second adhesive layer 114 is between about 25 microns and about 50 microns. In some embodiments, the thickness of the first adhesive layer 112 is at least ten times the thickness of the second adhesive layer 114. For example, in a non-limiting example, the thickness of the first adhesive layer 112 may be about 400 microns to 600 microns and the thickness of the second adhesive layer 114 may be about 25 microns to 50 microns.

Figure 2:
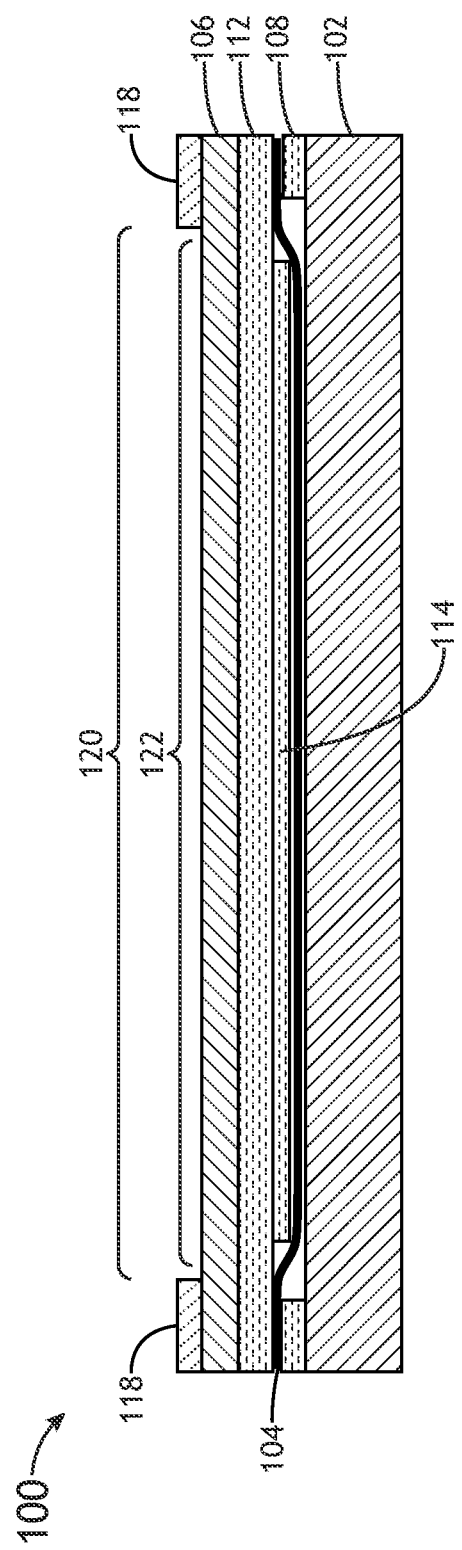
FIG. 2 is a schematic cross-section of the resistive touch sensor of FIG. 1, showing the increase in touch active area as a result of preconforming the sensor top sheet.

FIG. 2 is a schematic illustration of a further construction of the sensor 100. As shown, the sensor 100 includes a bezel 118 bonded on or otherwise covering the peripheral edge portion of the cover layer 106. The bezel 118 may serve to frame and leave exposed the viewable area 120 of an assembly including the sensor 100, and also conceal the underlying peripheral edge seal 108 from view from above. By including the second adhesive layer 114 to induce the shape change in the sensor top sheet 104, the movement of the sensor top sheet portions proximate the peripheral edge seal 108 closer to the base layer 102 expands the touch active area 122 of the sensor 100 as compared to touch sensor constructions without an inset adhesive layer and preconformed sensor top sheet. As such, nearly the entirety of the viewable area 120 can become touch active area.

Figure 3:
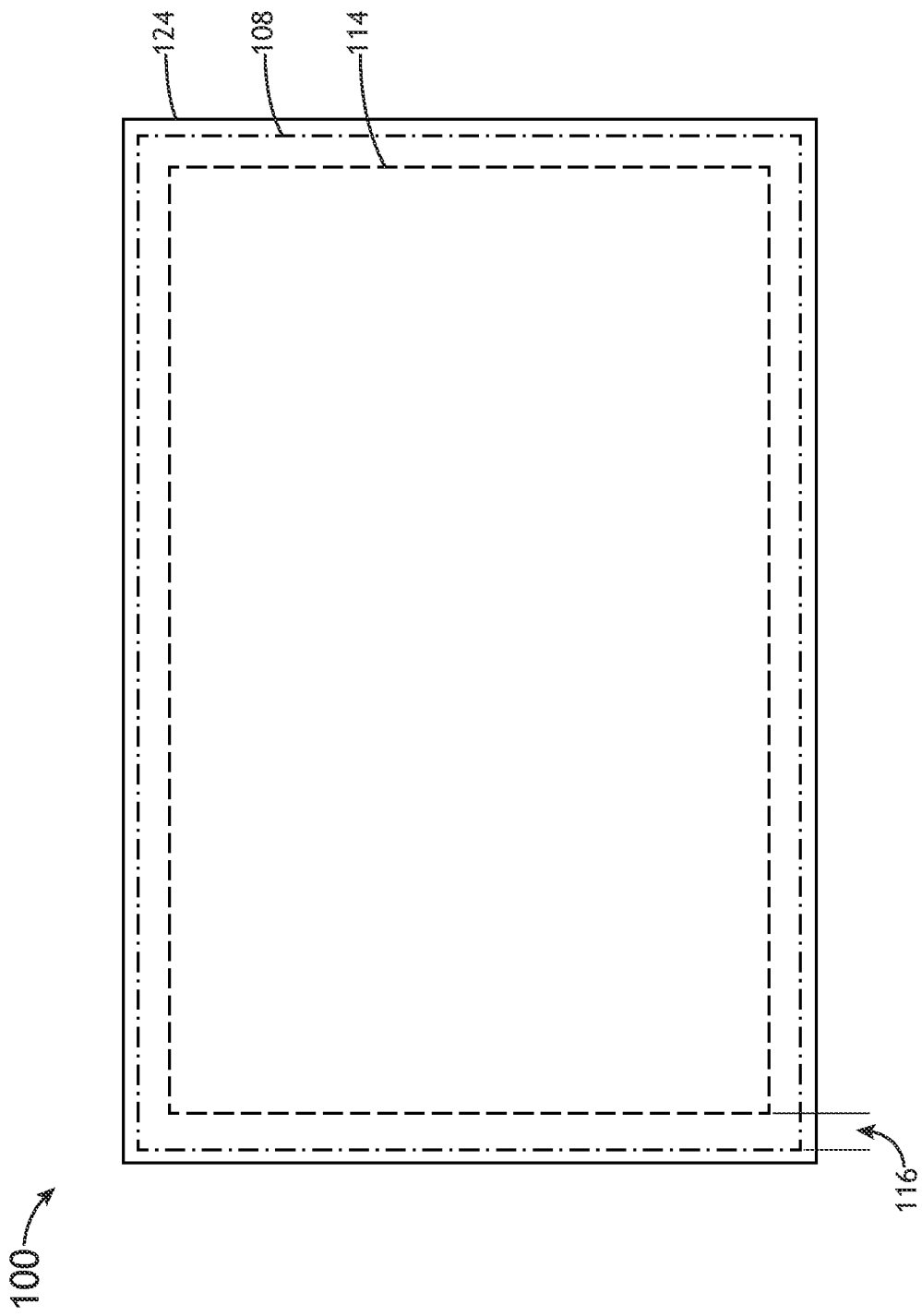
FIG. 3 is a schematic plan view of the resistive touch sensor showing the relative positions of the peripheral edge seal and the inset adhesive layer, in accordance with example embodiments of this disclosure.

FIG. 3 is a schematic plan view of the sensor 100 showing the peripheral display edge 124 and relative positions of the peripheral edge seal 108 and second adhesive layer 114 relative to the peripheral display edge 124. As shown, the peripheral edge seal 108 extends from at or about the peripheral display edge 124 to a position inward of the peripheral display edge 124. The second adhesive layer 114 is positioned inward relative to the peripheral edge seal 108 such that the continuous peripheral gap 116 is formed between the second adhesive sheet 114 and the peripheral edge seal 108. The gap spacing and height of the second adhesive layer 114 may be determined based on the dimensions of the perimeter edge seal 108.

Figure 4:
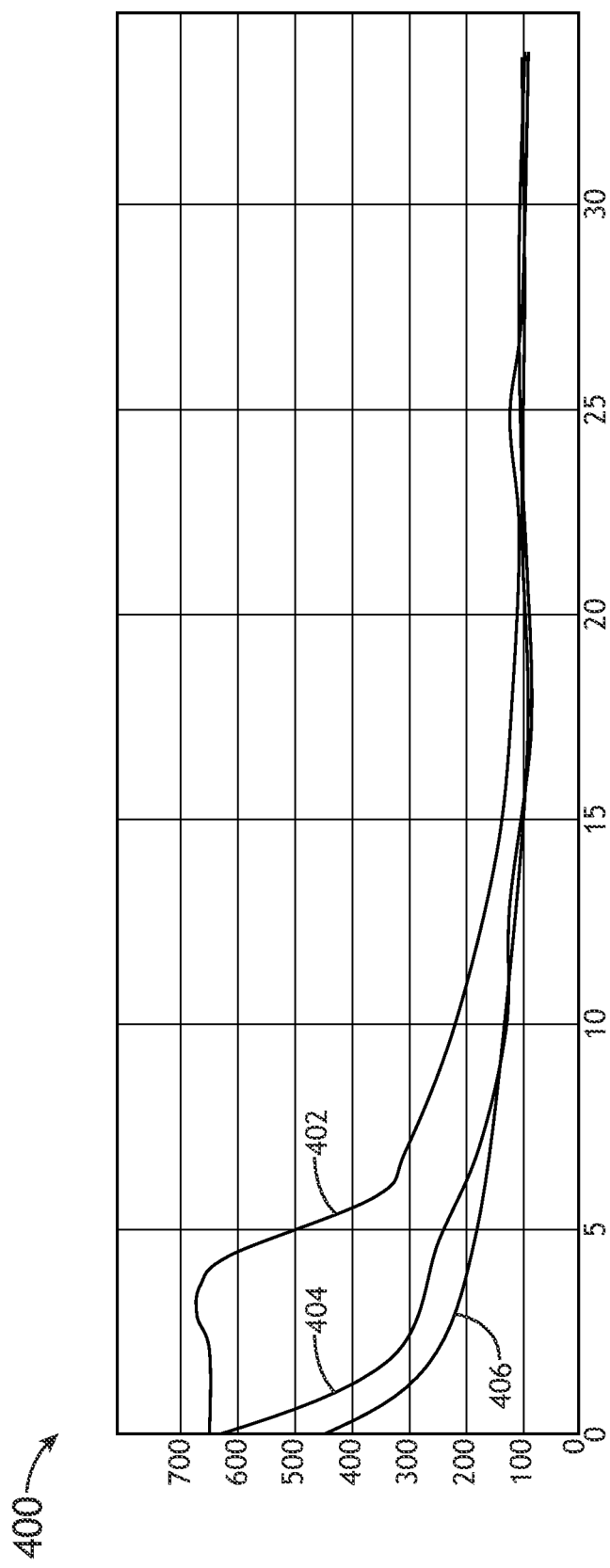
FIG. 4 is a graph illustrating improvements in active touch force by implementing the inset adhesive layer, in accordance with example embodiments of this disclosure.

FIG. 4 illustrates schematically the improvement in touch force and touch force uniformity of an assembly including the additional inset adhesive layer as described above. The graph 400 plots the required increase in touch force as a percentage of center nominal along the y axis against the increasing distance from an edge/corner along the x axis. As shown, plot line 402 represents the activation force required in a conventional touch sensor without the inset adhesive layer, plot line 404 represents the activation force required with the inset adhesive layer according to a first configuration, and plot line 406 represents the activation force required with the inset adhesive layer according to a second configuration different from the first configuration. The difference between the first configuration and the second configuration may include one or more of the inset adhesive layer thickness, gap width, ratio of peripheral seal thickness to inset layer thickness, etc. From the graph 400, it is evident that the touch force required for activation near the peripheral edges/corners of the sensor is greater in a conventional construction (plot line 402) as compared to the sensor constructions including the inset adhesive layer (plot lines 404 and 406), and that the inset adhesive layer may be tuned to achieve a desired activation force profile.

Figure 5:
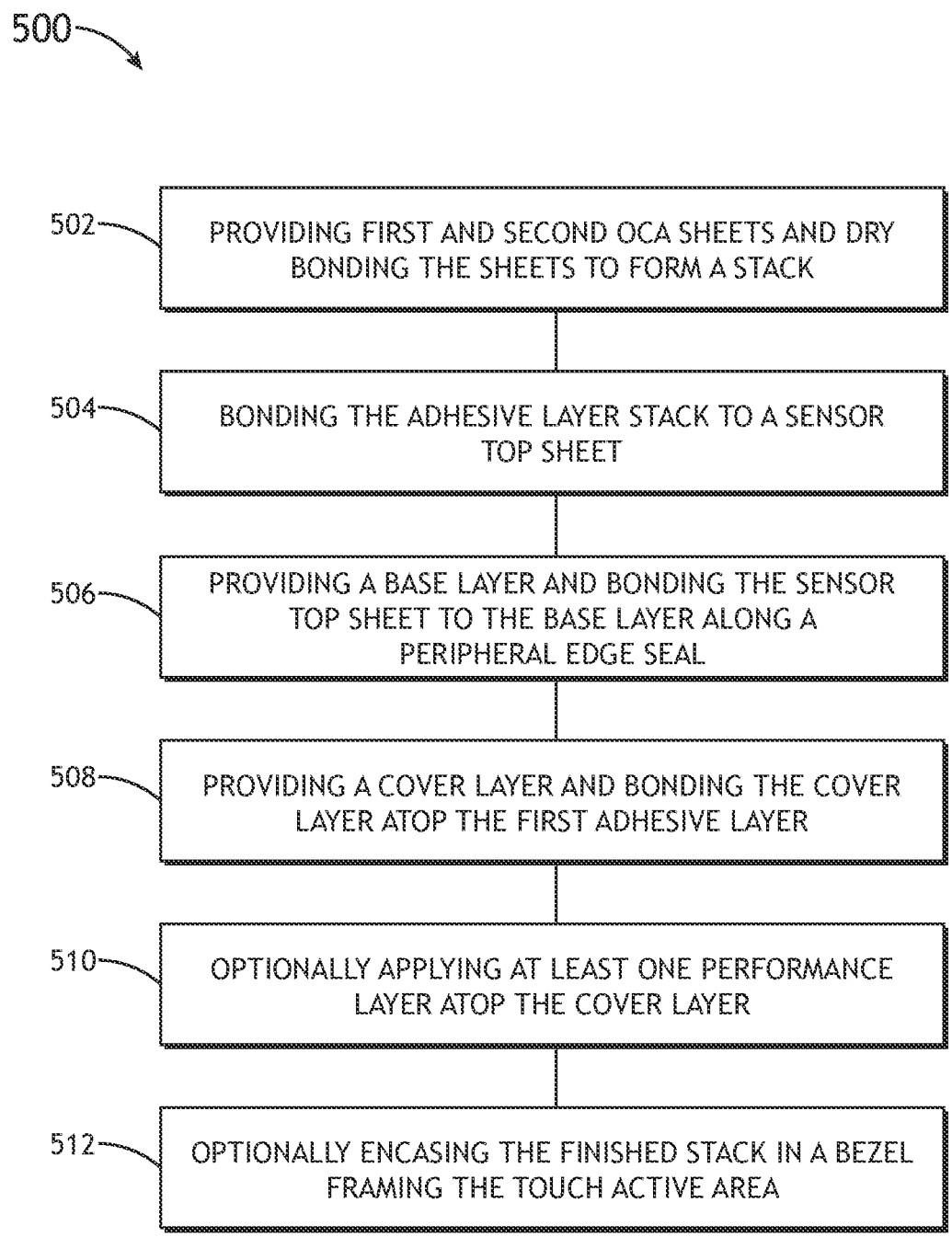
FIG. 5 is a flow diagram illustrating a method of manufacturing a resistive touch sensor, in accordance with example embodiments of this disclosure.

FIG. 5 illustrates an example implementation of a method 500 of constructing a resistive touch sensor according to the present disclosure. In general, operations of disclosed processes (e.g., method) may be performed in an arbitrary order, unless otherwise provided in the claims. The method may further include any step or operation implied or required by the product embodiments described herein. The products described above may also include any additional component or functionality expressed or implied by the method.

At Step 502, the method includes providing first and second adhesive layers and dry bonding the layers to form an adhesive layer stack. In embodiments, the second adhesive layer is dimensioned smaller than the first adhesive layer such that peripheral edges of the second adhesive layer are positioned inward relative to the peripheral edges of the first adhesive layer. In embodiments, each of the first and second adhesive layers may be OCA in sheet form. At Step 504, the bonded adhesive layer stack is bonded on the second adhesive layer side to a sensor top sheet such that the peripheral edge portions of the sensor top sheet are bonded to the first adhesive layer in a first plane, the inner portion of the sensor top sheet is bonded to the second adhesive layer in a second plane parallel to the first plane, and the portion of the sensor top sheet between the peripheral edge portions and the inner portions transition the sensor top sheet from the first plane to the second plane.

At Step 506, the method continues with providing a base layer, for instance a glass substrate and bonding the sensor top sheet to the base layer along a peripheral edge seal. In embodiments, compliant spacer posts are positioned between the sensor top sheet and the base layer inward of the peripheral edge seal. At Step 508, the method further includes providing a cover layer and bonding the cover layer atop the first adhesive layer to form the finished stack. In an optional Step 510, the method includes applying at least one performance layer, for instance an anti-reflective layer, atop the cover layer. In an optional Step 512, the finished stack may be encased within a bezel framing the viewable and touch active area of the assembly.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A resistive touch panel sensor, comprising:
a base layer;
a sensor top sheet positioned in spaced apart relation above the base layer;
a peripheral edge seal formed between the sensor top sheet and the base layer;
a first adhesive layer bonded on a peripheral edge portion of the sensor top sheet;
a second adhesive layer, inset relative to the peripheral edge seal, positioned between the first adhesive layer and the sensor top sheet, the second adhesive layer bonded on a first side to the first adhesive layer and bonded on a second side to a portion of the sensor top sheet corresponding to a touch active area, wherein the second adhesive layer changes planarity of the sensor top sheet proximate the peripheral edge seal; and
a cover layer bonded on the first adhesive layer.

2. The sensor according to claim 1, wherein the second adhesive layer is spaced inward from the peripheral edge seal, along each edge of the second adhesive layer, such that a continuous peripheral gap is formed between the peripheral edge seal and the second adhesive layer.

3. The sensor according to claim 1, wherein a width of the continuous peripheral gap formed between the peripheral edge seal and the second adhesive layer is at least 100 microns wide.

4. The sensor according to claim 1, wherein a thickness of the second adhesive layer is no greater than a thickness of the peripheral edge seal.

5. The sensor according to claim 1, wherein a thickness of the second adhesive layer is less than a thickness of the peripheral edge seal.

6. The sensor according to claim 4, wherein the thickness of the second adhesive layer is between 25 microns and 50 microns.

7. The sensor according to claim 1, wherein a thickness of the first adhesive layer is at least ten times a thickness of the second adhesive layer.

8. The sensor according to claim 1, wherein a thickness of the first adhesive layer is between 400 microns and 600 microns.

9. The sensor according to claim 1, wherein;
the base layer is glass;
the cover layer is glass; and
the first adhesive layer and the second adhesive layer are pressure-sensitive, matched optically clear adhesive (OCA).

10. The sensor according to claim 1, further comprising a bezel covering a peripheral edge portion of the cover layer.

11. A resistive touch sensor for an aircraft display application, comprising:
a base layer;
a sensor top sheet positioned in spaced apart relation above the base layer;
a peripheral edge seal provided between the sensor top sheet and the base layer;
a first adhesive layer bonded along a peripheral edge portion of the sensor top sheet;
a second adhesive layer, inset relative to the peripheral edge seal, positioned between the first adhesive layer and the sensor top sheet, the second adhesive layer bonded on a first side to the first adhesive layer and bonded on a second side to a portion of the sensor top sheet corresponding to a touch active area, wherein the second adhesive layer alters the planarity of the sensor top sheet proximate the peripheral edge seal such that the touch active area is positioned closer to the base layer as compared to the peripheral edge portion of the sensor top sheet; and
a cover layer bonded on the first adhesive layer.

12. The sensor according to claim 11, wherein the second adhesive layer is spaced inward from the peripheral edge seal, along each edge of the second adhesive layer, such that a continuous peripheral gap is formed between the peripheral edge seal and the second adhesive layer.

13. The sensor according to claim 11, wherein:
a width of the continuous peripheral gap formed between the peripheral edge seal and the second adhesive layer is at least 100 microns wide; and
a thickness of the second adhesive layer is no greater than a thickness of the peripheral edge seal.

14. A method of manufacturing a resistive, touch sensor, comprising:
providing a first adhesive layer;
providing a second adhesive layer, the second adhesive layered dimensioned smaller than the first adhesive layer;
dry bonding the first and second adhesive layers such that the peripheral edges of the second adhesive layer are positioned inward relative to the peripheral edges of the first adhesive layer;
dry bonding the bonded first and second adhesive layers on a sensor top sheet further bonded in spaced apart relation, via a peripheral edge seal, to a base layer, wherein the first adhesive layer bonds to a peripheral edge portion of the sensor top sheet and the second adhesive layer bonds to a touch active area of the sensor top sheet such that the sensor top sheet is caused to deform proximate the peripheral edge seal to position the touch active area of the sensor top sheet closer to the base layer as compared to the peripheral edge portion of the sensor top sheet; and
bonding a cover layer on the first adhesive layer.

15. The method according to claim 14, wherein the second adhesive layer is bonded to the sensor top sheet such that a continuous peripheral gap is formed between the peripheral edge seal and the second adhesive layer.

16. The method according to claim 14, wherein a width of the continuous gap formed between the peripheral edge seal and the second adhesive layer is at least 100 microns.

17. The method according to claim 14, wherein a thickness of the peripheral edge seal is greater than a thickness of the second adhesive layer.

18. The method according to claim 17, wherein the thickness of the second adhesive layer is between 25 micron and 50 microns, and wherein a thickness of the first adhesive layer is at least ten times the thickness of the second adhesive layer.

19. The method according to claim 14, wherein:
the base layer is glass;
the cover layer is glass; and
the first adhesive layer and the second adhesive layer are pressure sensitive, matched optically clear adhesive (OCA).

20. The method according to claim 14, further comprising bonding a bezel on a peripheral edge portion of the cover layer.

\* \* \* \* \*